(No Model.)
A. T. LINDERMAN.
CUT-OFF SAWING MACHINE.
No. 411,925. Patented Oct. 1, 1889.
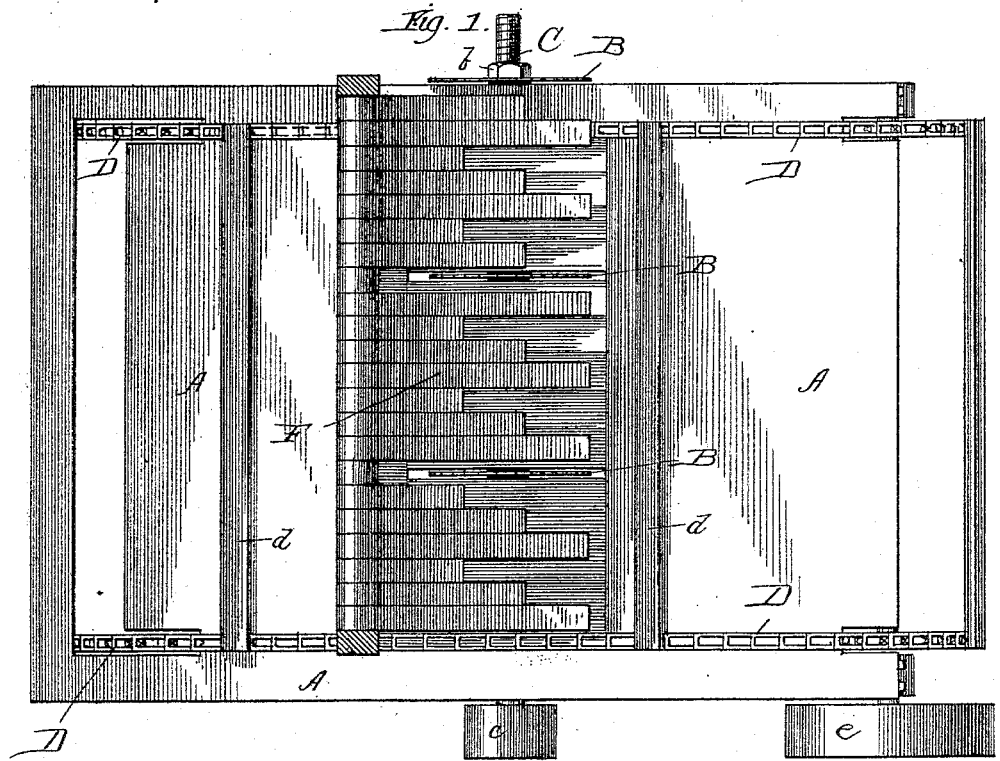
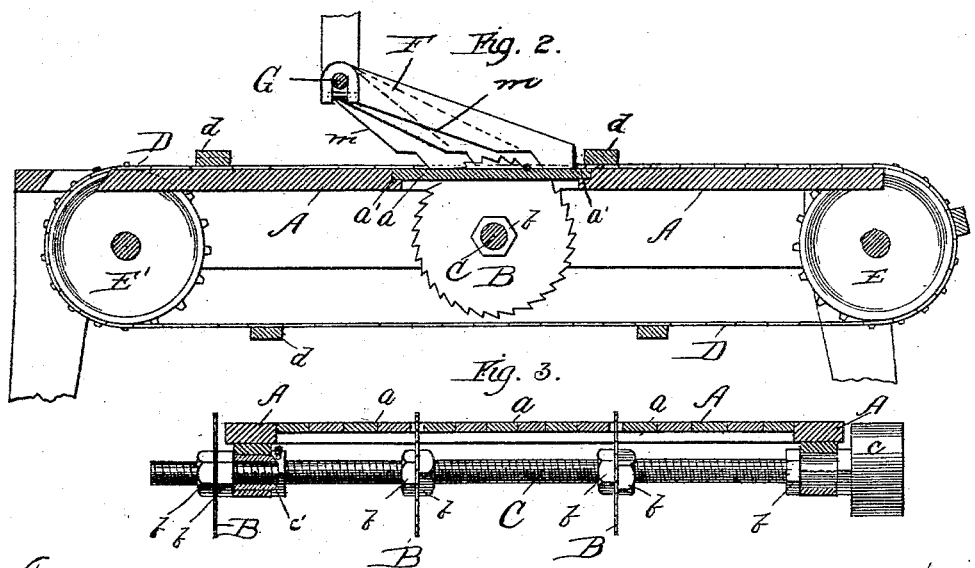
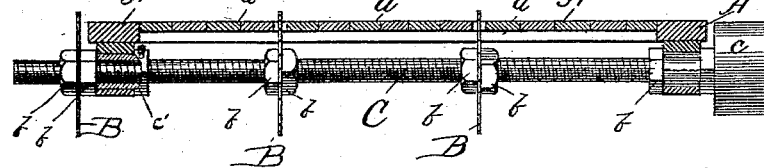
Witnesses:
Frank J. Blanchard
H. W. Munday
Inventor:
Albert T. Linderman
By Munday Evarts & Adcock
his Attorneys.

UNITED STATES PATENT OFFICE.

ALBERT T. LINDERMAN, OF WHITEHALL, MICHIGAN.

CUT-OFF SAWING-MACHINE.

SPECIFICATION forming part of Letters Patent No. 411,925, dated October 1, 1889.

Application filed March 1, 1889. Serial No. 301,670. (No model.)

*To all whom it may concern:*

Be it known that I, ALBERT T. LINDERMAN, a citizen of the United States, residing at Whitehall, in the county of Muskegon and State of Michigan, have invented a new and useful Improvement in Cut-Off Sawing-Machines, of which the following is a specification.

This invention relates to machines for sawing up box and similar stuff; and the object of the invention is to render both the saws and the devices for holding down the stuff adjustable, so that the lengths into which the stuff is cut may be varied at will. I employ in the machine an endless carrier for pushing the stuff past the saws; and another object of the invention is to adapt this carrier so that it will permit the various adjustments in position of the saws. In the machine the saws are mounted upon a screw-threaded arbor with locking-nuts at each of their sides, such construction allowing the saws to be moved laterally upon the arbor by simply moving the nuts; and to accommodate these changes in position of the saws that portion of the table through which the saws project is formed of a number of narrow pieces placed side by side longitudinally of the table and supported at either end upon the stationary or non-changeable parts of the table. When the saws are to be moved, these short pieces are simply moved to the right or left upon their supports, as may be required by the changed location of the saws. To automatically hold the stuff down upon the table while it is being sawed, I employ a number of weight-exerting arms, which are pivoted at one end upon a bar above and extending across the table and rest at their other ends upon the table, the latter ends being so fashioned as that the bars of the carrier and the stuff operated will pass under and lift them as they move along past the saws. This construction causes the gravity of the arms to be exerted upon the stuff while the latter is passing under them. The arms are also movable laterally on their supporting-bar, so that a space can be formed between any two of them to give room for the saws. These and other features of my invention will be fully understood from the drawings and subjoined description.

In the drawings, Figure 1 is a plan of my machine. Fig. 2 is a longitudinal vertical section, and Fig. 3 is a partial cross-section upon the line of the saw-arbor.

Similar letters of reference indicate like parts throughout the several figures.

In said drawings, A A represent the stationary parts of the table, and B B are the saws mounted upon the arbor C and driven by the pulley $c$.

D D are endless chains which, with the slats $d$, form the endless carrier for pushing the stuff to be sawed. These chains pass over pairs of sprocket-wheels E and E', the former being driven by the pulley $e$ upon the same shaft therewith.

As already stated, the saws are laterally adjustable upon the arbor, the latter being threaded throughout its length, except at the bearing of the pulley end, and each saw being provided with nuts $b$ at either side for locking it in position. At the other bearing a bushing $c'$ is interposed between the arbor and the box. This threaded feature of the arbor, as will be obvious, permits the saws to be moved to any position upon the threaded portion.

That part of the table through which the saws extend I form of a number of narrow pieces of wood $a$, such pieces extending longitudinally of the table and finding support upon ledges $a'$ upon the stationary parts A. When the saws are changed in position, these slats can be taken out or slid along upon the supporting-ledges as may be requisite to change the openings for the saws to accord with the positions of the latter.

The slats $d$ of the carrier are of wood and in height extend above the top line of the saws, whereby the saws, whatever may be their position, may cut their way through the under sides of the slats without severing or destroying them, so that the slats thus retain sufficient strength for their work even after numerous changes of the saws and the cutting of a corresponding number of channels through their under surfaces.

The holding-arms are shown at F and are loosely pivoted upon a cross-bar G, located a sufficient distance above the table and carrier to prevent interference by the bar with the stuff. From the supporting-bar the arms extend down to and rest upon the table in an inclined position, such inclination being preferably in the direction in which the carrier moves. The ends of the arms which rest upon the table are of course so fashioned that they will be lifted by and ride over and upon the slats and stuff as the latter move along. To this end the arms may be provided with inclined surfaces $m$, as shown. The free ends of the arms, while riding upon the stuff, of course exert their gravity-pressure thereon; but it is desirable that no individual arm be very heavy, and hence, to obtain the necessary holding action, which will free the operator from all necessity of looking after the stuff subsequent to placing it on the table in position to be caught by the slats of the carrier, I provide quite a number of the arms, as shown; and they may also be made of differing lengths, so that some of them will begin to act before others and some continue their action after others have ceased, thus distributing the holding power throughout the width of the stuff. This is a valuable feature where the material is wide.

By having a considerable number of holding or gravity arms it is also rendered an easy matter to adjust them laterally upon the supporting-bar, so that they will not interfere with the saws when the positions of the latter are changed. The arms have open slots adapted to be set down over the supporting-bar G, Fig. 2, and some of them are cut away or shortened to give room to the saws, as shown. These peculiarities allow the ready changing of the position of the short ones to accommodate changes in the location of the saws, as will be easily understood.

I claim—

1. The combination, in a cut-off sawing-machine, of the adjustable saw or saws, a carrier, and a stationary table having a portion made changeable to accommodate the adjustments of the saw, such changeable portion being composed of movable narrow pieces $a$, substantially as set forth.

2. The combination, with the table and saw or saws of a cut-off sawing-machine, of an endless carrier having wood-pushing slats, such slats passing over the saws and extending both above and below the top thereof, substantially as set forth.

3. The combination, with the table and the adjustable saw or saws, of an endless carrier having wood-pushing slats, such slats passing over the saws and extending both above and below the top thereof, substantially as set forth.

4. The cut-off sawing-machine, consisting of an adjustable saw or saws, a table changeable to accommodate the saw adjustments, and an endless carrier, the pushing-slats whereof are of wood and extend both below and above the top of the saws, substantially as set forth.

5. The combination, with the table, the carrier, and the laterally-adjustable saw or saws, of arms for holding down the stuff, such arms being movable to different positions upon their support to accommodate the different positions of the saws, substantially as set forth.

6. The cut-off sawing-machine, consisting of an adjustable saw or saws, a table for supporting the stuff to be sawed and changeable to accommodate the various positions of the saws, an endless carrier for pushing the stuff along the table, and arms movable to different positions upon their support to accommodate adjustment of the saws and adapted to hold down the stuff while being sawed, substantially as set forth.

ALBERT T. LINDERMAN.

Witnesses:
PAUL I. HEDGES,
FRANK R. WHITING.